Aug. 6, 1957   W. H. RAWLINGS   2,801,878
EXTENSIBLE HOUSE TRAILER
Filed Nov. 10, 1954   4 Sheets-Sheet 1
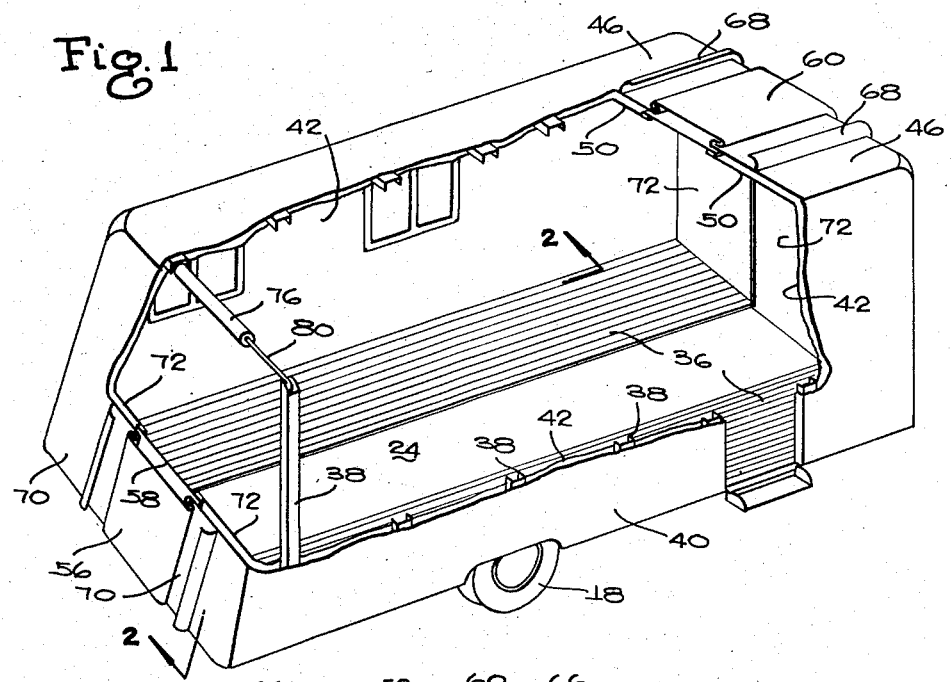
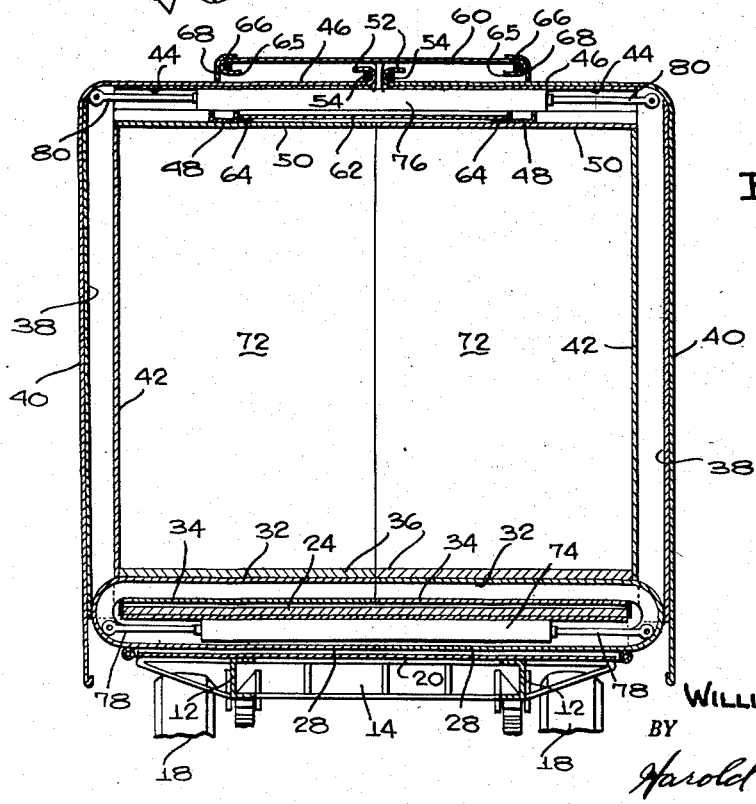
INVENTOR.
WILLIAM H. RAWLINGS
BY
Harold K. Martin
ATTORNEY

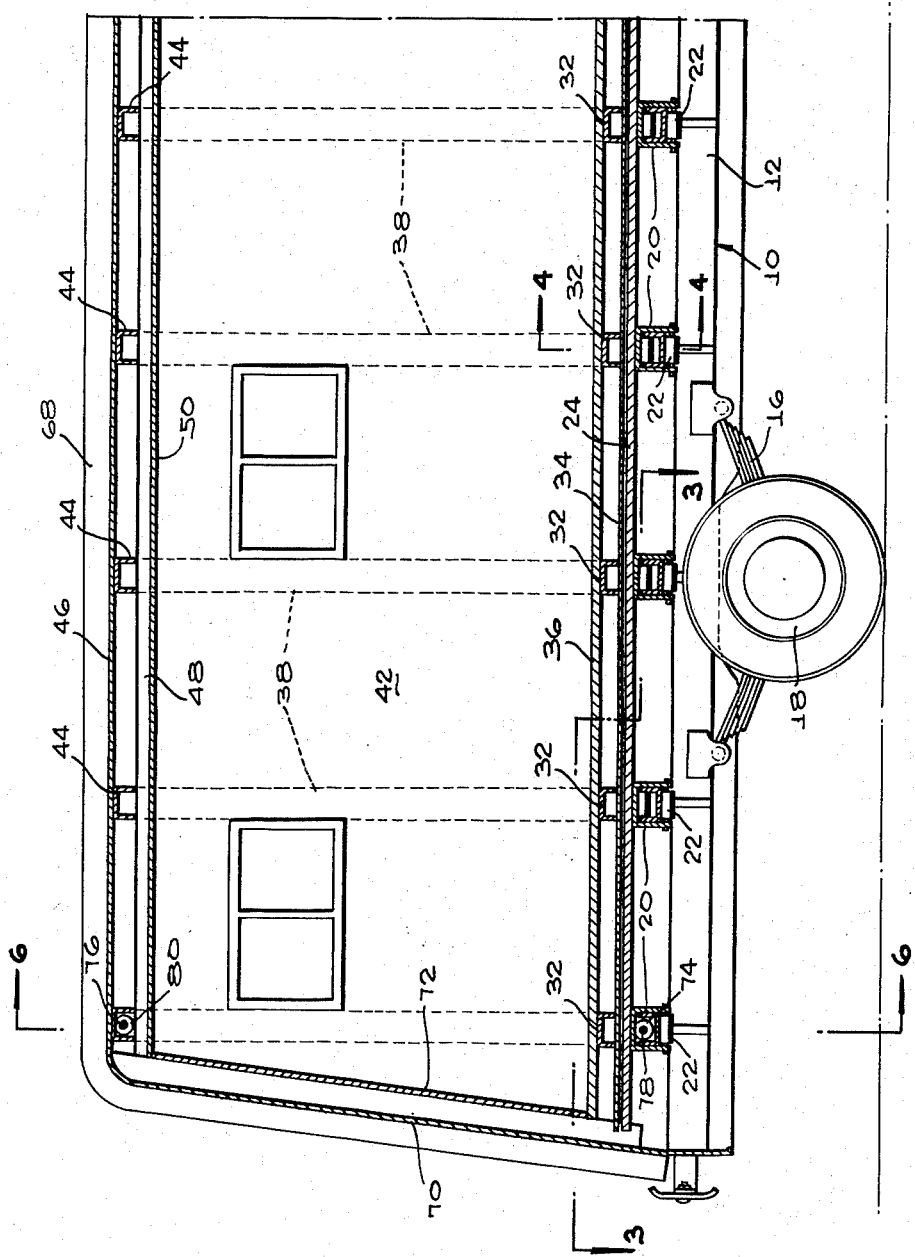

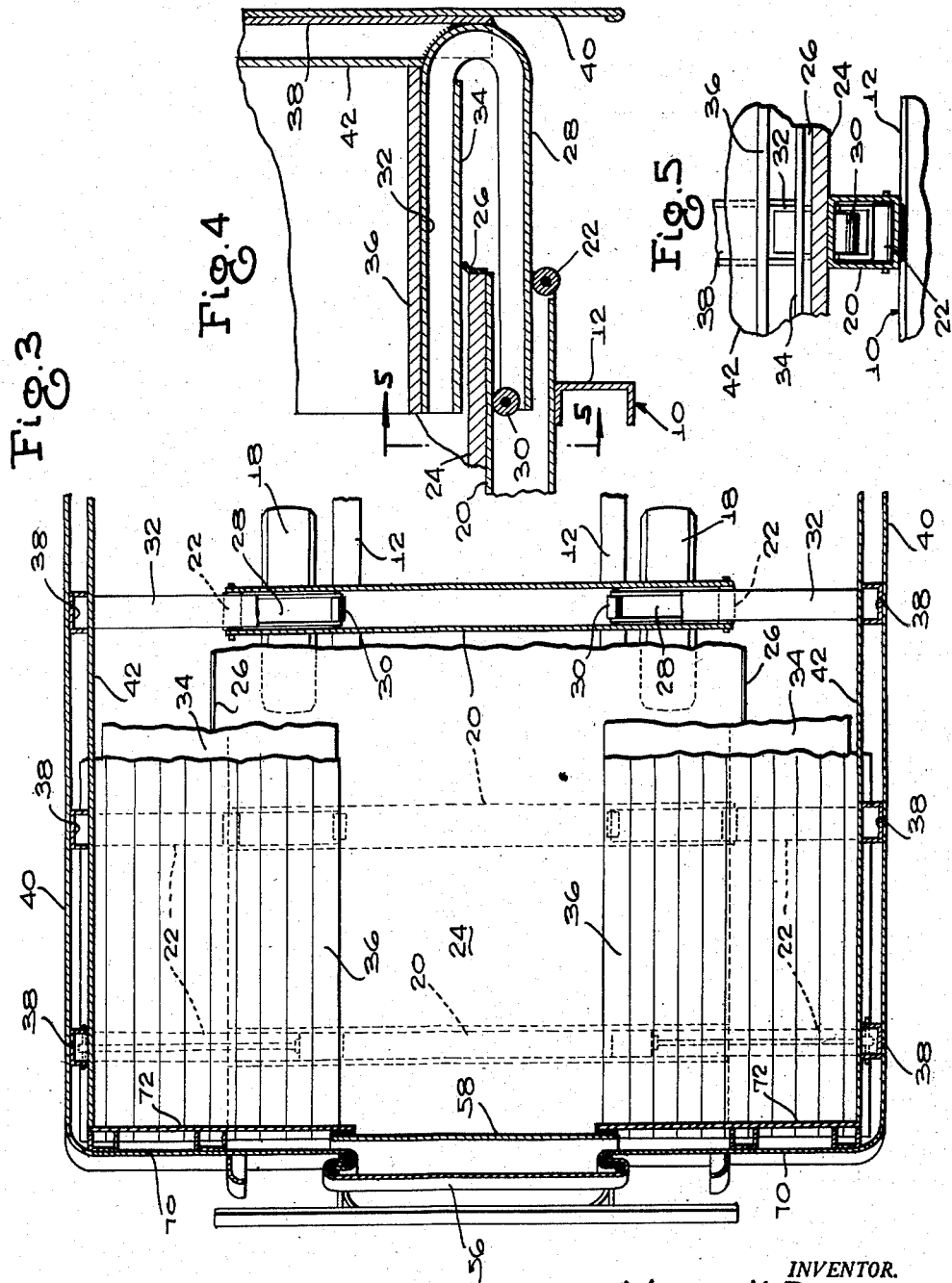

Aug. 6, 1957 W. H. RAWLINGS 2,801,878
EXTENSIBLE HOUSE TRAILER
Filed Nov. 10, 1954 4 Sheets-Sheet 4
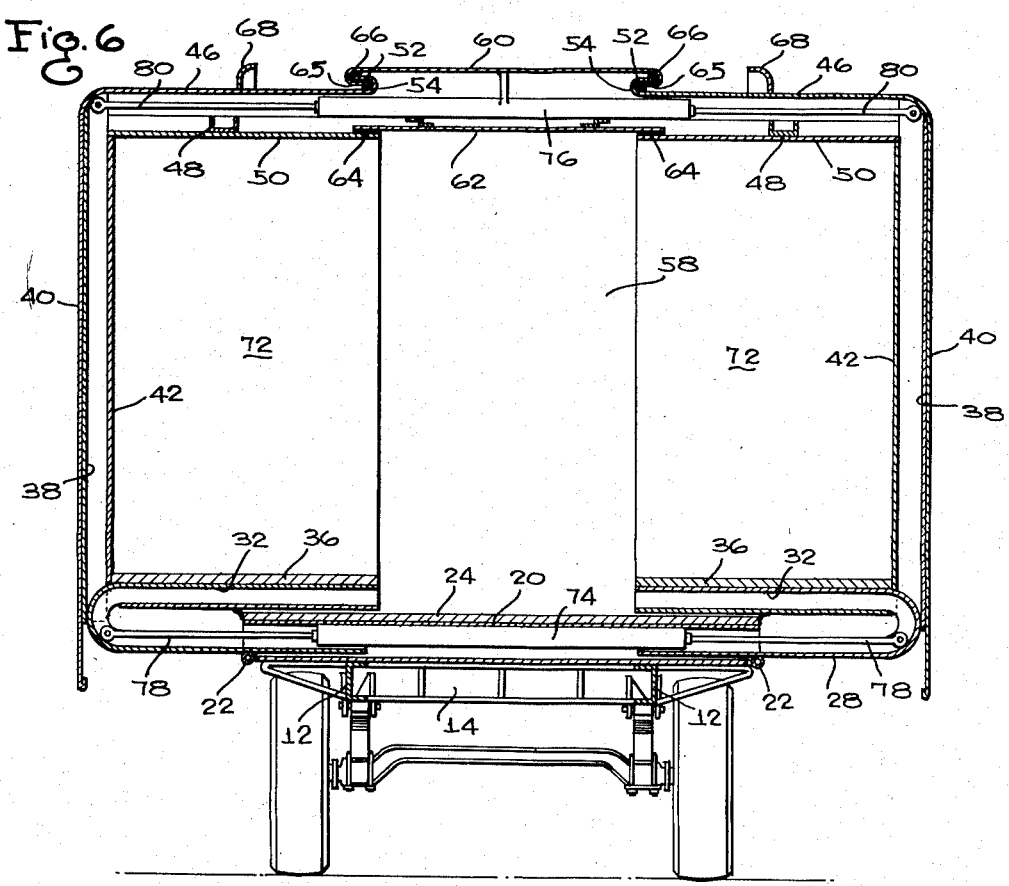
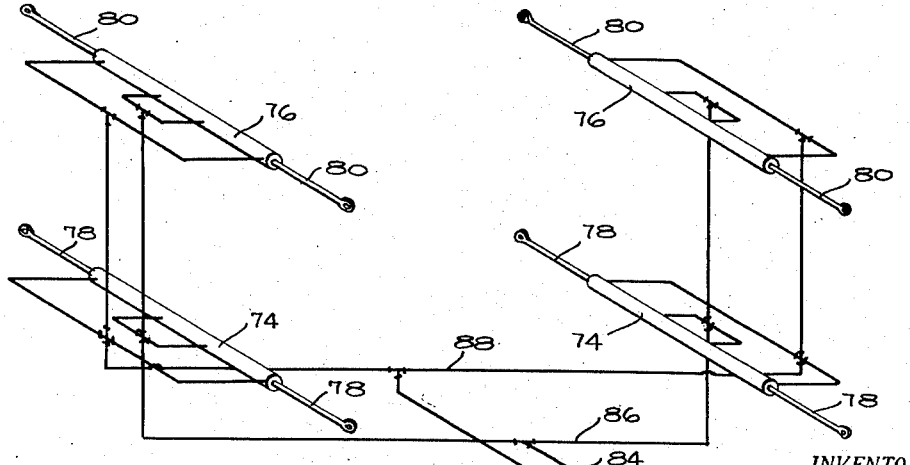
INVENTOR.
WILLIAM H. RAWLINGS
BY
Harold K. Martin
ATTORNEY

United States Patent Office 2,801,878
Patented Aug. 6, 1957

2,801,878

EXTENSIBLE HOUSE TRAILER

William H. Rawlings, Borger, Tex.

Application November 10, 1954, Serial No. 467,946

5 Claims. (Cl. 296—23)

This invention relates to an extensible house trailer and has for its primary object to provide adequate accommodations while enabling the device to be transported within the width requirements of vehicle traffic along a highway.

Another object is to enable the trailer to be readily extended or collapsed according to the wishes of the user.

A further object is to so support the trailer furniture that it will occupy but a minimum of space within the trailer and to provide ample floor space within the trailer when the latter is expanded.

A still further object is to exclude the elements and dust and dirt from the interior of the trailer when it is in either its fully collapsed or fully expanded position.

The above and other objects may be attained by employing this invention which embodies among its features a mobile frame, tubular cross beams carried by the frame and extending transversely thereacross, extensions carried by the cross beams and telescopically entering opposite ends thereof, and roof and side wall supporting bows carried by the extensions and extending upwardly therefrom adjacent the ends thereof remote from the cross beams.

Other features include furniture and floor supporting arms carried by the extensions and extending inwardly from the ends thereof remote from the crossbeams in spaced relation to said extensions, floor panels carried by the arms and extending longitudinally adjacent opposite sides of the frame and wipers carried by the cross-beams and extending upwardly therefrom for engaging the panels and excluding dust and dirt from the interior of the trailer.

Still other features include a fixed roof panel carried by the frame and extending longitudinally thereof in vertically spaced relation to the floor, side panels carried by the bows and extending upwardly from the extensions adjacent opposite sides of the frame, and movable roof panels carried by the bows and movable therewith beneath the fixed roof from an extended to a contracted position.

Still further features include extensible and contractible means carried by selected cross beams and by the fixed roof and operatively connected to the bows for expanding and contracting the device.

In the drawings:

Figure 1 is a perspective view of an extensible house trailer embodying the features of this invention, certain portions being broken away to more clearly illustrate certain details of the invention, Figure 2 is a fragmentary longitudinal sectional view taken substantially on the line 2—2 of Figure 1, Figure 3 is a fragmentary horizontal sectional view taken substantially on the line 3—3 of Figure 2, Figure 4 is an enlarged sectional view taken substantially on the line 4—4 of Figure 2, Figure 5 is a fragmentary sectional view taken substantially on the line 5—5 of Figure 4, Figure 6 is a transverse sectional view of the trailer taken substantially on the line 6—6 of Figure 2, showing the trailer extended, Figure 7 is a view similar to Figure 6 showing the trailer contracted, and Figure 8 is a diagrammatic view of the hydraulic extending and contracting system.

Referring to the drawings in detail a frame 10 including spaced side rails 12 and transversely extending end bars 14 is suspended as by springs 16 on wheels 18 so as to be mobile and capable of being transported by a traction vehicle. The structure so far defined is conventional and forms no part of this invention except in combination therewith.

Mounted on the side rails 12 and extending transversely across the frame 10 are longitudinally spaced tubular cross beams 20 of rectangular cross section. Mounted in the cross beams for rotation adjacent opposite ends thereof are rollers 22 forming bottom supports for the extensions to be more fully hereinafter described. Secured to the cross beams 20 and extending across the tops thereof is a main floor or deck 24 carrying adjacent opposite longitudinal side edges thereof upwardly extending wipers 26 of a suitable flexible material.

Telescopically entering opposite ends of the cross beams 20 are extensions 28 of transversely U-shaped cross-section with the bight portions or webs of the channels riding on the rollers 22. Similar rollers 30 are carried by the extensions 28 adjacent the inner ends thereof and bear on the under sides of the top walls of the cross-beams 20 to cooperate with the rollers 22 in holding the extensions in place. Carried by the outer ends of the extensions 28 and extending inwardly therefrom in vertically spaced parallel relation to said extensions are furniture supporting arms 32 carrying on their under sides panels 34 which cooperate with the wipers 26 in defining dust stops adjacent opposite longitudinal side edges of the floor 24. Floors 36 are carried by the arms 32 above the level of the main floor 24 and the furniture of the vehicle is supported thereon.

Welded or otherwise secured to the extensions 28 and extending vertically upwardly therefrom adjacent the outer ends thereof are channel shaped roof and side wall supporting bows 38, the side flanges of which straddle the extensions 28 and portions of the arms 32. Secured to the outer sides of the bows 38 and extending throughout the length of the trailing vehicle are outer side panels 40, and secured to the inner sides of the bows are inner side panels 42. The upper ends of the bows 38 extend horizontally inwardly to define supports 44 for cooperating roof panels 46 which extend horizontally across the tops of the supports 44 and join the side panels 40 to define weather tight junctions therewith. The supports 44 are of inverted channel shaped cross section and carry on their under sides intermediate opposite ends downwardly extending stops 48 to the under sides of which are secured ceiling panels 50. As will be readily understood upon reference to Figures 6 and 7 the adjacent edges of the roof panels 46 are provided with vertically spaced longitudinally extending flanges 52 carrying channel shaped gaskets 54 the purpose of which will hereinafter appear.

Carried by opposite end bars 14 of the frame 10 are upwardly extending permanent outer end walls 56 and permanent inwardly spaced inner end panels 58 and carried by the end walls and extending longitudinally in spaced parallel relation above the floor 24 is a permanent roof sections 44 to engage opposite side edges of the panels 58 in vertically spaced relation to the roof 60 and carried by and extending downwardly from the ceiling panel 62 adjacent opposite longitudinal side edges thereof are wipers 64 which have continuous engagement with the ceiling panels 50 to define dust stops. Carried by the permanent roof 60 and extending longitudinally in downwardly spaced relation thereto adjacent opposite side edges thereof are horizontally disposed flanges 65 having gaskets 66 therein which are engaged by the flanges 52 when the trailer is extended to define weather tight junctions between the roof sections 46 and 60. Trough shaped guards 68 are carried by and extend upwardly from the roof sections 44 to engage opposite side edges of the permanent roof section 60 when the sides of the trailer are contracted as will be readily understood upon reference to Figure 7.

Carried by opposite ends of the extensible side portions of the trailer are end walls 70 and end panels 72 which respectively cooperate with the permanent end walls 56 and permanent end panels 58 in extensibly closing opposite ends of the trailer.

In order to extend and contract the trailer transversely extending hydraulic cylinders 74 are disposed in selected cross beams 20 and similar hydraulic cylinders 76 are supported in longitudinally spaced relation by the permanent roof 60 above the ceiling panel 62. Pistons are mounted within the cylinders to reciprocate therein adjacent opposite ends thereof, and carried by the pistons and extending through opposite ends of the cylinders are piston rods 78 and 80. The ends of the piston rods 78 remote from the cylinders are connected to the extensions 28 adjacent their outer ends, and the ends of the piston rods 80 are connected to the bows 38 adjacent the upper ends thereof so that as the pistons move within the cylinders the sides of the trailer will move in unison therewith. A conventional hydraulic system 82 is connected through a conventional control valve 84 with pipe 86 which opens into the cylinders 74 and 76 adjacent their inner ends and pipe 88 which opens into the cylinders 74 and 76 adjacent their outer ends. It will thus be seen that when the valve 84 is turned one way fluid under pressure will flow through the pipe 86 to expand the trailer and when the valve is turned another way the trailer will be contracted. Obviously the valve 84 may be turned into a position in which no fluid can pass through the pipes 86 and 88 so that the trailer can be locked in expanded or contracted position.

In use during transporation the trailer is hauled along a roadway in its contracted condition so as to avoid interference with traffic. Upon arrival at its destination the valve 84 is turned to admit hydraulic pressure to the inner ends of the cylinders 74 and 76 to urge the piston rods outwardly and thereby expand the trailer to approximately three times its volume. With the trailer furniture supported on the floors 36, the intermediate portion of the main floor 24 will be clear for use by the occupants. When it is again desired to transport the trailer, the pressure system 82 is set into operation and the valve 84 is so turned as to admit fluid under pressure to the pipe 88 and thence to the cylinders 74 and 76 adjacent their outer ends and hence move the piston rods inwardly to contract the trailer.

While in the foregoing there has been shown and described the preferred form of this invention, it is to be understood that minor changes in the details of construction, combination and arrangement of parts may be resorted to without departing from the spirit and scope of the invention as claimed.

What is claimed is:

1. An extensible house trailer comprising a mobile frame, tubular cross beams carried by the frame and extending transversely thereacross, extensions carried by the cross beams and telescopically entering opposite ends thereof, floor supporting arms carried by the extensions adjacent the ends thereof remote from the cross beams, said arms extending in vertically spaced parallel relation to and above the extensions, and roof and side wall supporting bows carried by and extending upwardly from the ends of the extensions remote from the cross beams.

2. An extensible house trailer comprising a mobile frame, tubular cross beams carried by the frame and extending transversely thereacross, extensions carried by the cross beams and telescopically entering opposite ends thereof, floor supporting arms carried by the extensions adjacent the ends thereof remote from the cross beams, said arms extending in spaced parallel relation to and above the extensions, roof and side wall supporting bows carried by and extending upwardly from the ends of the extensions remote from the cross beams, a main floor carried by the cross beams, panels carried by the arms, and flexible dust seals carried by the floor and extending upwardly from opposite side edges thereof and into wiping engagement with the panels.

3. An extensible house trailer comprising a mobile frame, tubular cross beams carried by the frame and extending transversely thereacross, extensions carried by the cross beams and telescopically entering opposite ends thereof, floor supporting arms carried by the extensions adjacent the ends thereof remote from the cross beams, said arms extending in vertically spaced parallel relation to and above the extensions, roof and side wall supporting bows carried by and extending upwardly from the ends of the extensions remote from the cross beams, a main floor carried by the cross beams, panels carried by the undersides of the arms above the level of the main floor, and dust seals carried by the main floor and extending upwardly therefrom into wiping engagement with the panels.

4. An extensible house trailer comprising a mobile frame, tubular cross beams carried by the frame and extending transversely thereacross, extensions carried by the cross beams and telescopically entering opposite ends thereof, floor supporting arms carried by the extensions adjacent the ends thereof remote from the cross beams, said arms extending in spaced parallel relation to and above the extensions, roof and side wall supporting bows carried by and extending upwardly from the ends of the extensions remote from the cross beams, a main floor carried by the cross beams, panels carried by the arms, and flexible dust seals carried by the floor and extending upwardly from opposite side edges thereof and into wiping engagement with the panels, and floors carried by the arms above the level of the main floor.

5. An extensible house trailer comprising a mobile frame, tubular cross beams carried by the frame and extending transversely thereacross, extensions carried by the cross beams and telescopically entering opposite ends thereof, roof and side wall supporting bows carried by the extensions and extending upwardly therefrom adjacent the ends thereof remote from the cross beams, a fixed roof panel carried by the frame and extending longitudinally thereabove intermediate opposite ends of the beams, and cooperating roof panels carried by the bows for movement thereby transversely of the frame below the fixed roof panel, flanges carried by the fixed roof panel and extending inwardly from opposite side edges thereof in spaced relation thereto, and cooperating flanges carried by the cooperating roof panels and extending outwardly therefrom in parallel relation to adjacent side edges thereof for interengagement with the flanges on the main roof panel to effect weather tight seals between the roof panels, and trough-shaped guards carried by the cooperating roof panels and extending upwardly therefrom intermediate the sides thereof for partially embracing the flanges on the fixed roof panel when the sides of the trailer are collapsed.

References Cited in the file of this patent

UNITED STATES PATENTS

| | | |
|---|---|---|
| 2,212,591 | De Manghi | Aug. 27, 1940 |
| 2,494,680 | Wiley | Jan. 17, 1950 |

FOREIGN PATENTS

| | | |
|---|---|---|
| 1,064,404 | France | Dec. 23, 1953 |
| 585,382 | Great Britain | Feb. 5, 1947 |
| 285,325 | Switzerland | Jan. 5, 1953 |